…

United States Patent Office 2,865,923
Patented Dec. 23, 1958

2,865,923
2-NITROETHYLHYDRAZINE DERIVATIVES

Robert E. Carnahan, Groton, and Robert E. Kent, Waterford, Conn., assignors to Chas. Pfizer & Co., Inc., Brooklyn, N. Y., a corporation of Delaware No Drawing. Application July 2, 1954
Serial No. 441,178

10 Claims. (Cl. 260—295)

This invention is concerned with a group of nitroethylhydrazine derivatives. These compounds have been found to be highly effective antimicrobial agents.

Although a variety of materials have been suggested as antimicrobial agents, many of these are quite expensive and others are not readily available or are prepared with difficulty. It has now been found that a series of antimicrobial agents may be readily prepared by the reaction of certain hydrazides with α-unsaturated nitro compounds (that is, compounds containing the group $-CH=CHNO_2$). β-Nitro styrenes are of particular value for the reaction. The products which are formed, generally consisting of solid white compounds generally crystalline in nature, have been shown to be active against a variety of organisms including Gram-negative bacteria, fungi, and other organisms such as certain plant pathogens. These materials may be used in low concentration to inhibit the growth of these organisms. They may be utilized as industrial antimicrobial agents or for incorporation in compositions which resist deterioration due to the attack of microorganisms, e. g., paper, wood products, insulating materials, etc.

The particular compounds with which this invention is concerned are formed by the addition of an organic acid hydrazide to a compound with the structure $$RCH=\overset{R}{\underset{}{C}}NO_2$$

wherein R is an organic radical. The use of a β-nitrostyrene compound is preferred. Essentially any organic hydrazide may be used which has two hydrogens on the nitrogen not attached to the acyl radical (i. e.

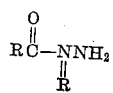

wherein R is an organic radical and $R^1$ is hydrogen or an organic radical). The hydrazide may be an aromatic compound, such as benzoylhydrazine, a heterocyclic compound, such as isonicotinoylhydrazine (isoniazid), a phenylalkylene hydrazide (e. g. cinnamoylhydrazine), a phenyl alkylhydrazide (e. g. phenylacetylhydrazine), or aliphatic hydrazides. The β-nitrostyrene that is used as the reactant may be either β-nitrostyrene itself, which is readily available or can be prepared by standard chemical methods, or a substituted β-nitrostyrene. Among the substituted β-nitrostyrenes which are useful are those substituted in the aromatic ring, particularly with an electronegative group such as a halogen (e. g. chlorine, iodine, bromine), a nitro group, and so forth. Various other groups may be present although these may tend to somewhat decrease the rate of reaction. They include alkyl groups (methyl, ethyl, propyl, etc.) hydroxyl and alkoxyl (methoxy, ethoxy, etc.). The various groups may be substituted at any one or more positions (ortho, meta, para) of the aromatic ring. Furthermore, the β-nitrostyrenes may be substituted on the β-carbon atom by a short carbon chain (branched or straight). These compounds may be prepared by condensing an aromatic aldehyde with a nitroalkane other than nitromethane. Thus the use of nitroethane will yield β-methyl-β-nitrostyrene which may then be reacted with a hydrazide.

The new process which is one object of the present invention may be shown by the following diagram in which compound II represents the new type of product.

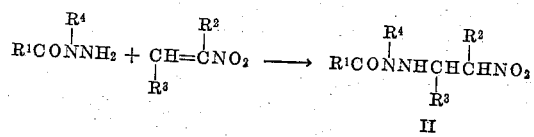

wherein $R^1$ is any organic radical with the preferred radical chosen from the group consisting of phenyl, heterocyclic, phenylalkyl, alkylphenyl, hydroxyphenyl, halophenyl, nitrophenyl, phenylalkylene, and alkyl (particularly long chain groups of greater than six carbons), $R^2$ and $R^4$ are preferably hydrogen or short chain alkyl groups having about one to four carbon atoms, and $R^3$ is preferably chosen from the group consisting of phenyl, halophenyl, and nitrophenyl although alkylphenyl, hydroxyphenyl, and alkoxyphenyl groups may also be used.

The process of the present invention is conducted by contacting the chosen hydrazide with the desired β-nitrostyrene. Although addition often takes place by merely mixing the two reactants, it is often desirable to use a solvent such as an organic solvent in which the two reactants are soluble, e. g. methanol, ethanol, propanols, butanols, benzene, toluene, etc. The condensation often takes place at room temperature. However, it may be found desirable to elevate the temperature of the mixture during the course of the reaction to assure rapid and complete reaction. Temperatures ranging from 30° C. to the boiling point of the solvent used are suitable, that is, up to about 150° C. In operating the process, about equimolecular proportions of the reactants are useful. However, a slight excess of one or the other is not harmful. The products which are formed often separate as crystalline solids from the reaction mixture and may be recovered after completion of the reaction by cooling the reaction mixture and filtering or otherwise separating the solid product. If the product is soluble in any solvent that has been used, the solvent may be removed, for instance, by distillation.

Among the products which have been formed according to the present process are 1-phenyl-1-isonicotinylhydrazino-2-nitroethane, 1 - phenyl-1-benzoylhydrazino-2-nitroethane, 1 - phenyl-1-(2-hydroxybenzoylhydrazino)-2-nitroethane and 1-(4'-chlorophenyl)-1-hexadecanoylhydrazino-2-nitroethane. This group of hydrazine derivatives is, as noted above, highly effective against a variety of microorganisms. Representative of such compounds and their activity is one of the substances named above, that is, 1-phenyl-1-(2-hydroxybenzoylhydrazino)-2-nitroethane, which has the structural formula:

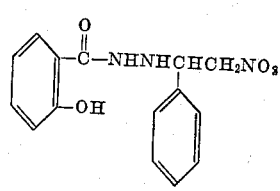

This compound has the activity indicated in the following table:

| Organism | Minimum Inhibitory Concentration in mcg./ml. |
|---|---|
| Staphylococcus aureus | 12.5 |
| Pseudomonas No. 173 | 6.25 |
| Salmonella B67 | 6.25 |
| E. coli | 6.25 |
| Candida albicans | 1.56 |
| Proteus sp | 3.12 |

The compound is added to standard nutrient agar media at various concentrations and cultures are streaked on the agar before incubation. The activity is determined by observing the incubated plates.

The activity of this compound against the various microorganisms in the table above was determined utilizing standard microbiological techniques. It indicates the high level of activity achieved by this type of compound.

The new compounds of this invention are active against a variety of plant pathogens, organisms which cause appreciable damage to vegetable matter including foliage and fruit. For instance, 1-phenyl-1-palmitoylhydrazino-2-nitroethane inhibits X. vesicatoria at less than 1000 mcg./ml. and A. niger, A. Oryzae and P. citrinium at less than 500 mcg./ml. Tests were run by incorporating the compounds in Sabouraud agar medium at various concentrations and streaking the medium with the test organism before incubation at 30° C. for 48 hours.

The following examples are given by way of illustration only and are not to be considered as limitations on the scope of this invention.

EXAMPLE I

*1-phenyl-1-isonicotinylhydrazino-2-nitroethane*

A solution of 6.9 g. (0.05 mole) of isonicotinoylhydrazine and 7.5 g. (0.05 mole) of β-nitrostyrene in 300 ml. of absolute ethanol was stored at room temperature for 3–4 days. The mixture was concentrated, cooled and the product was filtered. It weighed 9.7 g. When recrystallized from absolute ethanol the melting point was 141.5–142.5° C.

*Analysis.*—Calcd. for $C_{14}H_{14}N_4O_3$: C, 58.74; H, 4.93; N, 19.57. Found: C, 58.75; H, 5.12; N, 19.09.

EXAMPLE II

*1-phenyl-1-cinnamoylhydrazino-2-nitroethane*

To a solution of 0.81 g. of cinnamic acid hydrazide (M. P. 100.5–101.5° C.) in 100 ml. of absolute ethanol was added 0.75 g. of β-nitrostyrene, and the resulting solution was allowed to stand for 96 hours at room temperature in a stoppered flask. After removal of the solvent in vacuo, trituration of the oily residue with benzene gave 0.9 g. of crystalline material. This was recrystallized from benzene to give the purified product, melting point 151–154° C.

*Analysis.*—Calcd. for $C_{17}H_{17}N_3O_3$: C, 65.60; H, 5.49; N, 13.49. Found: C, 65.73; H, 5.53; N, 13.93.

This product is active against a culture of *Trichomonas vaginalis* at a concentration of less than 6 mcg./ml.

EXAMPLE III

*1-phenyl-1-palmitoylhydrazino-2-nitroethane*

A mixture of 1,800 ml. of absolute ethanol and 300 ml. of benzene was used to dissolve 10.8 g. of palmitic acid hydrazide (melting point 109–111° C.). After dissolution was complete, 6 g. of β-nitrostyrene was added, and the resulting solution was allowed to stand in a stoppered flask for 96 hours at room temperature. The solvents were then removed under vacuum to give a solid residue of 10.2 g. The crude product was recrystallized from absolute ethanol or normal hexane to give the pure product. This material melted at 77–78° C.

*Analysis.*—Calcd. for $C_{24}H_{41}O_3N_3$: C, 68.70; H, 9.85; N, 10.02. Found: C, 68.94; H, 9.51; N, 9.98.

EXAMPLE IV

*1-phenyl-1-benzoylhydrazino-2-nitroethane*

To a solution of 6.8 g. of benzoic acid hydrazide (melting point 111–115° C.) in 200 ml. of absolute ethanol was added 7.5 g. of β-nitrostyrene. The resulting mixture was filtered and allowed to stand in a stoppered flask at room temperature for 96 hours. The resulting clear solution was evaporated to dryness under vacuum. The oily residue was triturated with benzene to give 12.6 g. of white crystalline material. This was recrystallized from benzene to give the pure product, which melted at 104–106° C.

*Analysis.*—Calcd. for $C_{15}H_{15}O_3N_3$: C, 63.15; H, 5.30; N, 14.73. Found: C, 63.23; H, 5.27; N, 14.54.

EXAMPLE V

*1-phenyl-1-(2-hydroxybenzoylhydrazino)-2-nitroethane*

Salicylic acid hydrazide (7.6 g., melting point 147–149° C.) was dissolved in a mixture of a 1 liter of benzene (reagent grade) and 50 ml. of absolute ethanol. To this mixture was added 7.5 g. of β-nitrostyrene in 50 ml. of benzene (reagent grade). The resulting solution was filtered and allowed to stand in a stoppered flask at room temperature for 72 hours. The solvents were then removed under vacuum. The resulting oily residue crystallized upon standing overnight to give 12 g. of crude product. The crude product was recrystallized from benzene to obtain the pure compound. This melted at 76–78° C.

*Analysis.*—Calcd. for $C_{15}H_{15}O_4N_3$: C, 59.79; H, 5.02; N, 13.95. Found: C, 59.45; H, 5.07; N, 13.90.

EXAMPLE VI

*1-(4-chlorophenyl)-1-isonicotinoylhydrazino-2-nitroethane*

A mixture of 0.1 mole of 4-chloro-β-nitrostyrene and 0.1 mole of isonicotinoylhydrazine in 200 ml. of isopropanol was heated at 50° C. for several hours. The mixture was cooled and part of the isopropanol was removed under vacuum. The solid product that separated was filtered, washed and dried.

EXAMPLE VII

Equimolecular proportions of salicylic acid hydrazide and 3,4-dichloro-β-methyl-β-nitrostyrene were heated in a solvent for several hours. On cooling the mixture the desired addition product separated.

What is claimed is:

1. The compound of the formula:

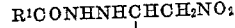

wherein $R^1$ is selected from the group consisting of phenyl, heterocyclic, phenylalkylene, hydroxyphenyl and long chain alkyl groups of greater than 6 carbon atoms.

2. The compound of claim 1 wherein $R^1$ is heterocyclic.

3. The compound of claim 1 wherein $R^1$ is phenylalkylene.

4. The compound of claim 1 wherein $R^1$ is hydroxyphenyl.

5. The compound of claim 1 wherein $R^1$ is long chain alkyl of greater than 6 carbon atoms.

6. 1-phenyl-1-(2-hydroxybenzoylhydrazino)-2-nitroethane.
7. 1-phenyl-1-palmitoylhydrazino-2-nitroethane.
8. 1-phenyl-1-cinnamoylhydrazino-2-nitroethane.
9. 1-phenyl-1-benzoylhydrazino-2-nitroethane.
10. 1-phenyl-1-isonicotinoylhydrazino-2-nitroethane.

References Cited in the file of this patent

Worrall: J. Am. Chem. Soc. 49, 1598–1605 (1927).
Byrkit et al.: Ind. Eng. Chem. 42, 1862–75 (1950).
Schales et al.: J. A. C. S., vol. 74, 1952, pp. 4486–90.
Chemical Society Journal, May 1953, Pt. 2, pp. 1358–1364.

UNITED STATES PATENT OFFICE
CERTIFICATE OF CORRECTION

Patent No. 2,865,923                                            December 23, 1958

Robert E. Carnahan et al.

It is hereby certified that error appears in the printed specification of the above numbered patent requiring correction and that the said Letters Patent should read as corrected below.

Column 1, lines 50 to 54, the formula should appear as shown below instead of as in the patent:

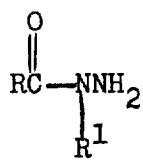

Signed and sealed this 12th day of May 1959.

(SEAL)
Attest:

KARL H. AXLINE                                                                              ROBERT C. WATSON
Attesting Officer                                                      Commissioner of Patents